United States Patent
Wapner et al.

(10) Patent No.: US 6,706,401 B1
(45) Date of Patent: Mar. 16, 2004

(54) CARBON MATRIX COMPOSITES FABRICATED BY A RAPID AND LOW-COST PROCESS INCORPORATING IN-SITU POLYMERIZATION OF WETTING MONOMERS

(75) Inventors: Phillip G. Wapner, Palmdale, CA (US); Wesley P. Hoffman, Palmdale, CA (US); Steven Jones, Lancaster, CA (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 85 days.

(21) Appl. No.: 09/948,437

(22) Filed: Sep. 10, 2001

Related U.S. Application Data (62) Division of application No. 09/100,774, filed on Jun. 8, 1998, now Pat. No. 6,309,703.

(51) Int. Cl.[7] .............................................. B32B 9/00
(52) U.S. Cl. .................... 428/408; 428/294.1; 428/107; 428/907; 428/698; 264/137; 264/257; 264/299; 264/447; 264/494; 264/463
(58) Field of Search ................... 428/697, 107, 428/112, 114, 367, 698, 902, 294.1, 294.7, 408; 264/135, 137, 257, 299, 447, 494, 496, 463

(56) References Cited

U.S. PATENT DOCUMENTS

| | | | | |
|---|---|---|---|---|
| 4,324,843 A | * | 4/1982 | Brennan et al. | 428/697 |
| 4,492,681 A | * | 1/1985 | Endou et al. | 423/345 |
| 4,970,123 A | * | 11/1990 | Witzke et al. | 428/545 |
| 5,053,175 A | * | 10/1991 | Birchall et al. | 264/60 |
| 5,077,242 A | * | 12/1991 | Nakamoto et al. | 501/95 |
| 5,096,519 A | | 3/1992 | Kawakubo et al. | |
| 5,215,666 A | * | 6/1993 | Kuszyk et al. | 222/591 |
| 5,318,930 A | * | 6/1994 | Leung et al. | 501/30 |

* cited by examiner

*Primary Examiner*—Merrick Dixon
(74) *Attorney, Agent, or Firm*—Charles E. Bricker; Thomas L. Kundert (57) ABSTRACT

This invention is a rapid low-cost technique for manufacturing thick high-performance carbon and ceramic composites in the form of uniformly densified near-net shaped structures. This is accomplished by impregnating composite preforms with low-viscosity wetting monomers which undergo polymerization followed by pyrolysis reactions in the preform ultimately creating ceramic and/or carbon matrices. Since the monomers possess low-molecular-weight they have low viscosities. Thus, if they wet the fiber and partially-densified preform they can easily impregnate even the smallest pores. Once inside the preforms, polymerization of the monomers is then initiated, resulting in a liquid matrix-precursor of the high molecular weight needed to produce a superior matrix (upon pyrolysis) with high efficiency.

2 Claims, 4 Drawing Sheets

CARBON MATRIX COMPOSITES FABRICATED BY A RAPID AND LOW-COST PROCESS INCORPORATING IN-SITU POLYMERIZATION OF WETTING MONOMERS

This is a division of application Ser. No. 09/100,774, filed Jun. 8, 1998, now U.S. Pat. No. 6,309,703.

STATEMENT OF GOVERNMENT INTEREST

The invention described herein may be manufactured and used by or for the Government for governmental purposes without the payment of any royalty thereon.

BACKGROUND OF THE INVENTION

The present invention relates to high-performance, high-temperature multi-dimensionally fiber-reinforced structural composites with carbon or ceramic matrices. These composites, which may have a complex shape, possess a uniform density even with thicknesses as great as 5 inches. The present invention also relates to a rapid, low-cost method of manufacture of these composites utilizing a wetting monomer, which is polymerized into the matrix precursor inside the preform.

Fiber-reinforced composites consist of two distinct components, fibers and matrix. Fibers, either continuous or in the form of short segments, are normally oriented in preferred directions in composites to utilize as much as possible the fiber's great strength and stiffness properties. However, for low performance applications the fibers can be randomly placed to lower the cost of fabrication. Because fibers are heavily drawn and stretched during manufacture, they have properties superior to those of the same material in its undrawn and unstretched state; i.e., their bulk properties.

The matrix consists of material surrounding the fibers and has two purposes. The first is to fill the space between the fibers, which increases density and physically holds the reinforcing fibers in the preferred direction. The second is to transmit forces applied to the overall composite structure to individual fibers in such a manner as to distribute any applied forces, or loads, as nearly as possible to all fibers simultaneously. In this fashion, the high-performance fiber properties are retained by the composite since fibers bear more-or-less equal loads and hence do not break individually. This is accomplished with greatest success when all void spaces around fibers are filled in with matrix material. The void spaces are usually referred to as "porosity."

An example of a naturally occurring composite is wood. High volume man-made composites are exemplified by polymer matrix composites, which are used principally for ambient temperature applications. The best known example of this family of composites is the fiberglass-epoxy composites used for ladders, boats and for body panels in Corvette automobiles.

For elevated temperature applications, high-temperature fiber-reinforced composites (HTFRC's) are employed. These composites consist of ceramic matrix and carbon-matrix composites reinforced with either carbon or ceramic fibers. These composites have excellent high-temperature strength retention, high strength-to-density ratio, good thermal conductivity, and possess fracture toughness. In addition, the carbon-carbon composites have high specific modulus and thermal shock resistance while the ceramic-ceramic composites have resistance to oxidation. High-performance HTFRC's are used for structural applications in aerospace and rocket propulsion, such as, heat shields, leading edges and nozzles. To fabricate a high-performance HTFRC it is necessary to employ a high volume fraction (volume occupied by fibers/volume of composite) of the proper type and orientation of high performance reinforcement fibers that are held together in the composite by a high-density, high-quality matrix material.

To make low-cost fiberglass composites, which are simply glass fiber-reinforced plastics, the process is rather straight-forward. One simply fixes the fibers in the position desired in the final product and then places the fluid matrix material around the fibers. When the polymer matrix sets, the composite is ready for use. In contrast, the manufacture of high-temperature fiber-reinforced composites (HTFRC's) such as fiber-reinforced ceramic matrix composites (FR/CMC's) and carbon matrix composites, such as carbon-carbon (C—C) composites is a much more difficult and expensive process, for a number of reasons. First, there is the much higher cost of the heat-resistant reinforcing fibers themselves. Many of these high-performance filamentous materials, such as silicon-carbide fibers or graphite fibers, are extremely brittle and difficult to handle. Forming them into fibers is therefore a very laborious and time-consuming process. Secondly, depending on the technique employed, positioning of fibers within the composite component being fabricated can also be an elaborate and expensive process. And lastly, surrounding the reinforcing fibers completely with an appropriate matrix is also a labor-intensive and very time-consuming process using existing technology. This is due principally to two factors. The first is a result of the extreme difficulties associated with physically handling high-performance fibers. Because of their inherent brittleness, placing matrix material around fibers (that have been oriented in such a fashion as to maximize the resulting composite's physical properties) must be undertaken with great care. Otherwise, fiber damage will more than offset the performance potential of FR/CMC's and carbon matrix composites. The second is a result of the difficulty of getting the matrix material to fill the void space in the preform as uniformly as possible. This requires many processing cycles involving many months and high energy costs as will be described in detail below.

Two categories of commercial processes have been developed to manufacture High-temperature Fiber-reinforced Composites (HTFRC) such as, fiber-reinforced ceramic matrix and carbon matrix composites. These processes differ principally in the techniques used for the deposition of matrix materials around reinforcing fibers that have already been oriented and positioned into the locations they will occupy in finished products. One technique is vapor-phase in nature and is called "infiltration." The other is liquid-phase in nature, and is called "impregnation." Both of these existing techniques share a common initial step. That is the formation of a "rigid-preform". This process can involve the holding of the fibers in the desired orientation and position in a mechanical frame and coating them with a suitable binder material, but usually involves the more simple steps of coating reinforcing fibers with a binder, which may be the same material as used to form the matrix, and then forming them into the desired shape by filament winding, hand lay-up, weaving, braiding, or some other means. This coated fiber preform is then heated to high-temperatures, with appropriate means taken to prevent loss of preform shape. The result of the heat treatment is the conversion of the binder to an inorganic cement. At this point any mechanical means of holding the fibers may be removed. The purpose of this cement, which can be produced from either a ceramic or hydrocarbon precursor, is to hold the reinforcing fibers in the shape desired for the final product. The ensemble of cemented fibers is called the rigidized-preform which is then subjected to subsequent processing. The task of heating the binder, or other materials used in HTFRC fabrication, to high temperatures to effect a change in chemical composition is usually referred to as "pyrolysis." In most cases, this modification of the binder is from an organic to an inorganic substance. The cement formed by pyrolysis of the binder is very porous because of the relationship between pyrolysis efficiency and binder physical-property requirements. As mentioned previously, great care must be taken when handling high-performance fibers or the resulting damage will greatly diminish composite properties. This means that forces encountered by the reinforcing fibers during coating and positioning must be minimal. This can only occur if binder viscosity is low and care is taken in handling. Unfortunately, pyrolysis efficiency (the weight percent of binder remaining after pyrolysis) is usually found experimentally to increase only when binder viscosity is high. One solution to this dichotomy is the following current manufacturing methodology: keep rigid-preform performance potential high by utilizing low viscosity binders, and adjust for the resulting high initial porosity with subsequent processing. This subsequent processing to deposit material between the fibers in the preform is usually referred to as "densification," and is usually repeated many times.

As mentioned above, densification using existing technology takes one of two forms. The first is vapor-phase-based and involves placing the rigid-preform in an oven containing gases which decompose at high temperatures inside the preform to form ceramic and/or carbon matrices. This process is referred to as chemical-vapor infiltration (CVI). The decomposition reaction is usually referred to as "cracking", since the splitting-apart of gas molecules is involved. However, it is also sometimes called pyrolysis, the same term used previously to describe similar thermal decomposition reactions occurring in solids and liquids. CVI has a number of problems associated with its use, the two most critical being pore closure at the surface leading to non-uniform densification, and poor matrix quality due to existence of multiple decomposition reaction-pathways leading simultaneously to multiple phases. Pore closure is detrimental because it denies access of infiltration gases to the preform interior. It occurs because cracking occurs more easily at solid surfaces. Thus, as gases attempt to enter rigid-preforms, decomposition takes place almost immediately on or near the hot exterior surfaces. This results in a density gradient through the sample, with a higher density matrix near the surface. This density gradient also limits the thickness of a high-performance part to less than 2". The preferential deposition on or near the surface ultimately leads to the sealing off of the surface pore entrances in a relatively short period of time. Multiple phases are also harmful in most instances because they do not join together or consolidate well, making the matrix weak. These problems are both minimized to some extent by slowing down the CVI process. Also, partially-densified composites can be periodically removed from the CVI oven and have their surfaces machined away enough to reopen sealed pore entrances. This is, of course, very time consuming and adds expense. For carbon matrix composites, prior to or subsequent to machining, the partially-densified preform is heated to ~2400° C. for long periods of time to convert the carbon matrix to a graphitic matrix. This process takes days to weeks and has associated high energy costs. The result of the steps described is processing times of many months, severe quality control problems, and associated high costs in both labor and energy.

The second densification process using existing commercial technology is liquid-phase-based. It involves impregnating rigid-preforms with liquid matrix-precursors and subsequently heating to high temperatures to initiate pyrolysis. It is in many ways similar to formation of rigid preform themselves, and suffers from the same drawbacks. Ease of impregnation and gentleness of handling are aided by lowered viscosity, but pyrolysis efficiency and matrix quality are enhanced by elevated viscosity. This is because the high viscosity matrix precursors produce a low porosity (high density) matrix which maximizes the physical integrity of the matrix thereby utilizing more and more of the reinforcing-fiber's performance potential. Ideally, for maximum mechanical properties there should be zero matrix porosity.

As with rigid-preform formation, the goal of attaining composite performance as high as possible presents a dilemma: use low-viscosity liquid matrix-precursors and obtain good impregnation, but poor pyrolysis efficiencies; or use high-viscosity liquid matrix precursors and obtain poor impregnation but high pyrolysis efficiencies. In either case, multiple liquid-densification steps will be needed because conversion of the matrix precursor normally results in a reduction of the matrix volume. In addition, like CVI processes, current liquid phase processes seal off the surface pores and preferentially close off small pores, producing a billet with non-uniform density. In addition, these processes also require machining to open up the surface pore structure and graphitization to enhance the properties of carbon matrixes. The result is again processing times of many months for high-matrix high-density high-performance composites. It is the deficiencies of the long processing times, high costs, and non-uniform matrix density of such liquid-phase based processing which this invention addresses.

It should be noted that liquid binders used in rigid-preform formation and liquid matrix-precursors employed in densification can be, but usually are not, the same chemical substance. In C—C composites, for example, the former is almost always phenolic in a solvent, while the latter is typically a refined petroleum or coal-tar pitch such as A240 or 15V. The fundamental chemical characteristic common to both liquid binders and liquid matrix-precursors used in all carbon and some ceramic matrix composites is that they are polymers. This fact explains why low-viscosity binders and precursors have low pyrolysis efficiencies and produce poor-quality matrices. In order to have low viscosity, polymers must possess a limited number of repeat units, otherwise entanglements between polymer chains occur during fluid flow limiting mass transport. During matrix formation by pyrolysis, the desired reaction is the loss of certain light constituents atoms, such as hydrogen, from polymer repeat units with no cleavage taking place between repeat units at all. However, in practice there is always unwanted but unavoidable side reactions in which there is the complete cleavage of individual repeat units off the ends of the polymer molecules thereby forming higher-molecular-weight gases. Since chain ends break off in cyclic fashion (i.e., one after another in rapid succession), pyrolysis yields are much lower in low-molecular-weight polymers than in high-molecular-weight polymers. High-molecular-weight polymers simply have far fewer chain ends to begin with, so there is much less end-breakage and associate gas evolution during pyrolysis. Gas evolution is detrimental because it pushes liquid matrix-precursor out of rigid-preforms before matrix formation by pyrolysis takes place and reduces the pyrolysis yield.

Moreover, high-molecular-weight polymers are better at aligning segments of their chain together than are low-molecular-weight polymers. The latter simply have too much mobility to stay aligned together for very long periods of time, especially at the high temperatures needed for pyrolysis to take place. They therefore tend to form poorly oriented or amorphous matrices. These typically have lower density and inferior physical properties. As stated before, the ideal liquid binder or liquid-matrix precursor should have high viscosity, at least from the viewpoint of pyrolysis efficiency and matrix quality. In light of the preceding observation, this would be due primarily to their having high molecular weights.

Two additional considerations, which are pertinent to understanding the negative aspects of existing liquid-densification techniques discussed above, are pressure impregnation, and wettability. Knowing that high viscosity liquid matrix-precursors do not easily enter and flow through pores in rigid-preforms, manufacturers of HTFRC's have enhanced entry and flow by immersing rigid-preforms in liquid matrix-precursor and applying pressure. This does in fact help impregnation. However, it requires that heated pressure vessels be employed, which are very costly, and cause fiber breakage if pressures are changed too rapidly.

Figure 1:
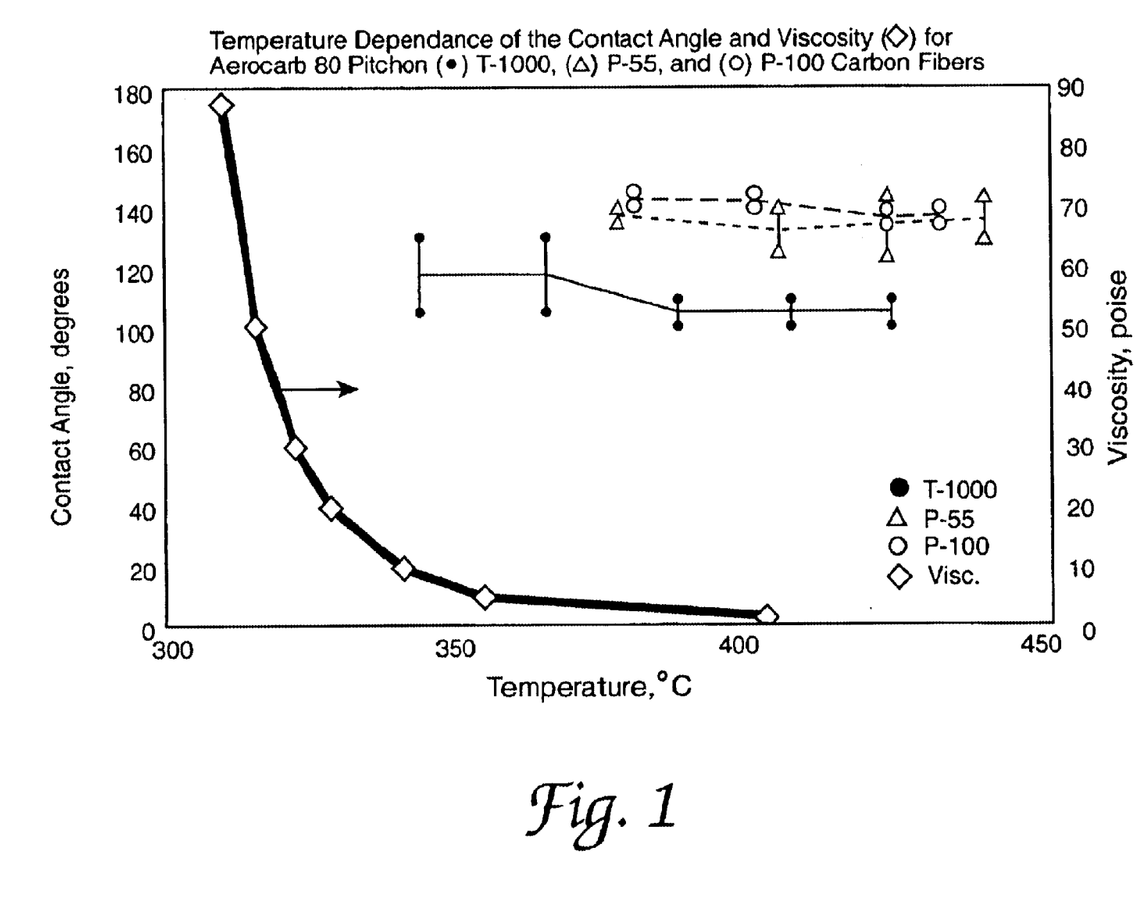
FIG. 1 illustrates the temperature dependence of the viscosity and contact angle for Aerocarb 80® pitch on various carbon fiber surfaces.
Figure 2:
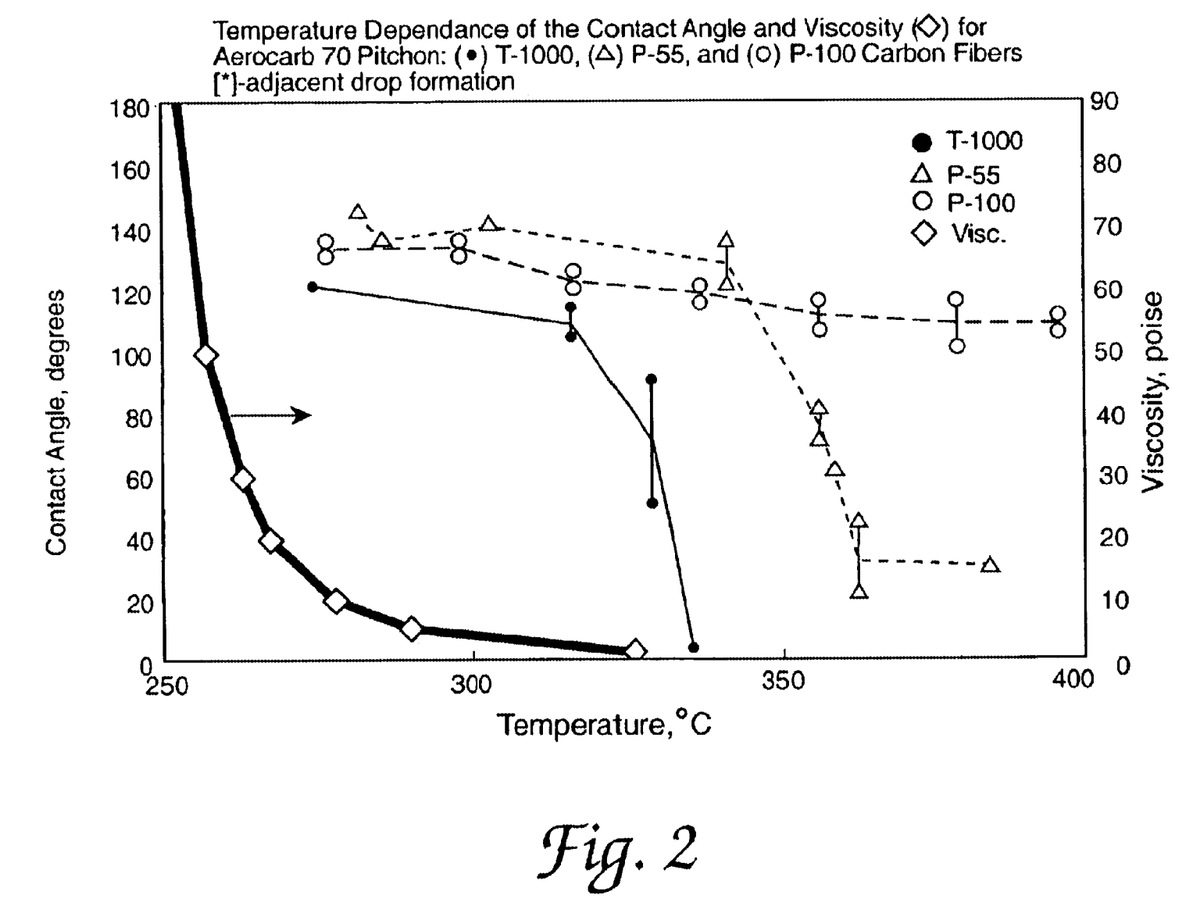
FIG. 2 illustrates the temperature dependence of the viscosity and contact angle for Aerocarb 70® pitch on various carbon fiber surfaces.
Figure 3:
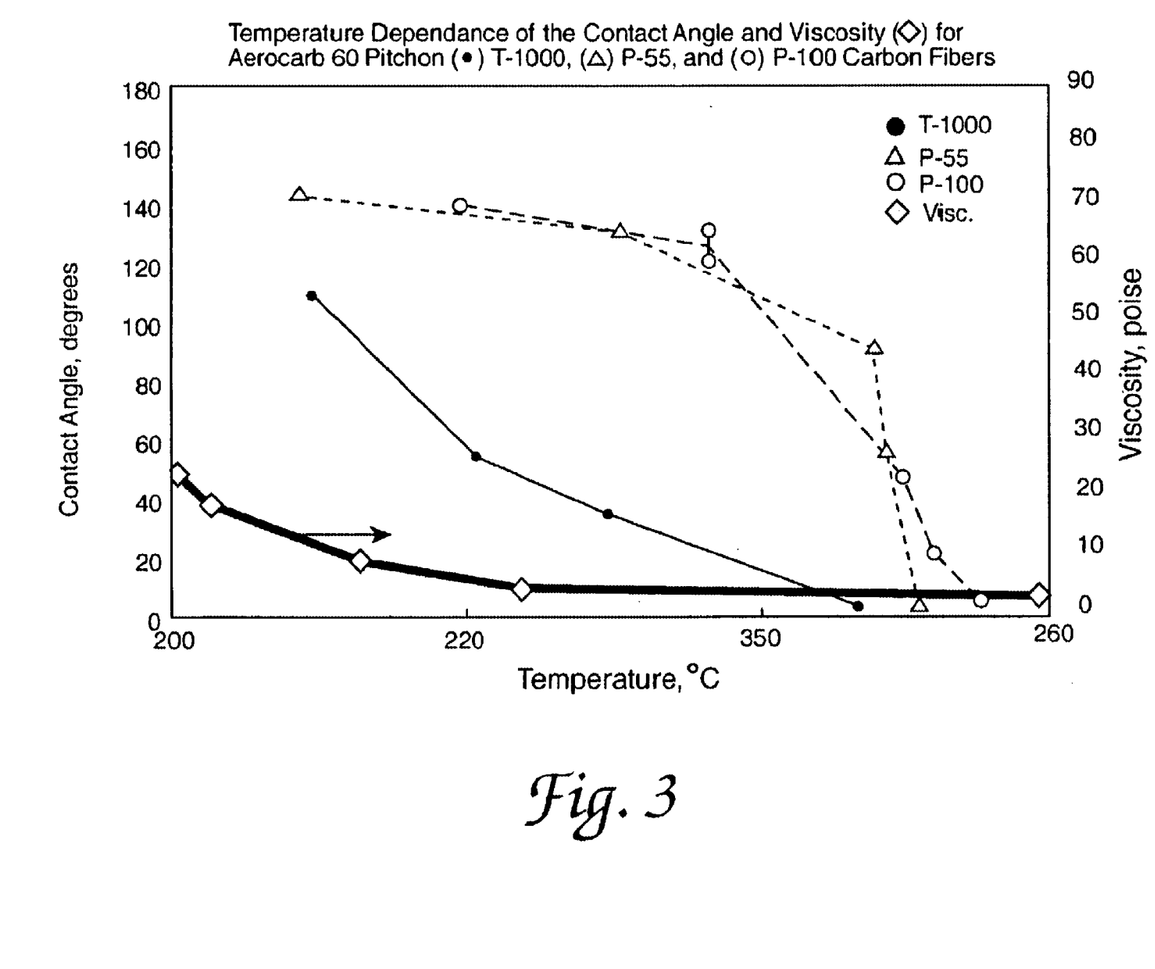
FIG. 3 illustrates the temperature dependence of the viscosity and contact angle for Aerocarb 60® pitch on various carbon fiber surfaces.
Figure 4:
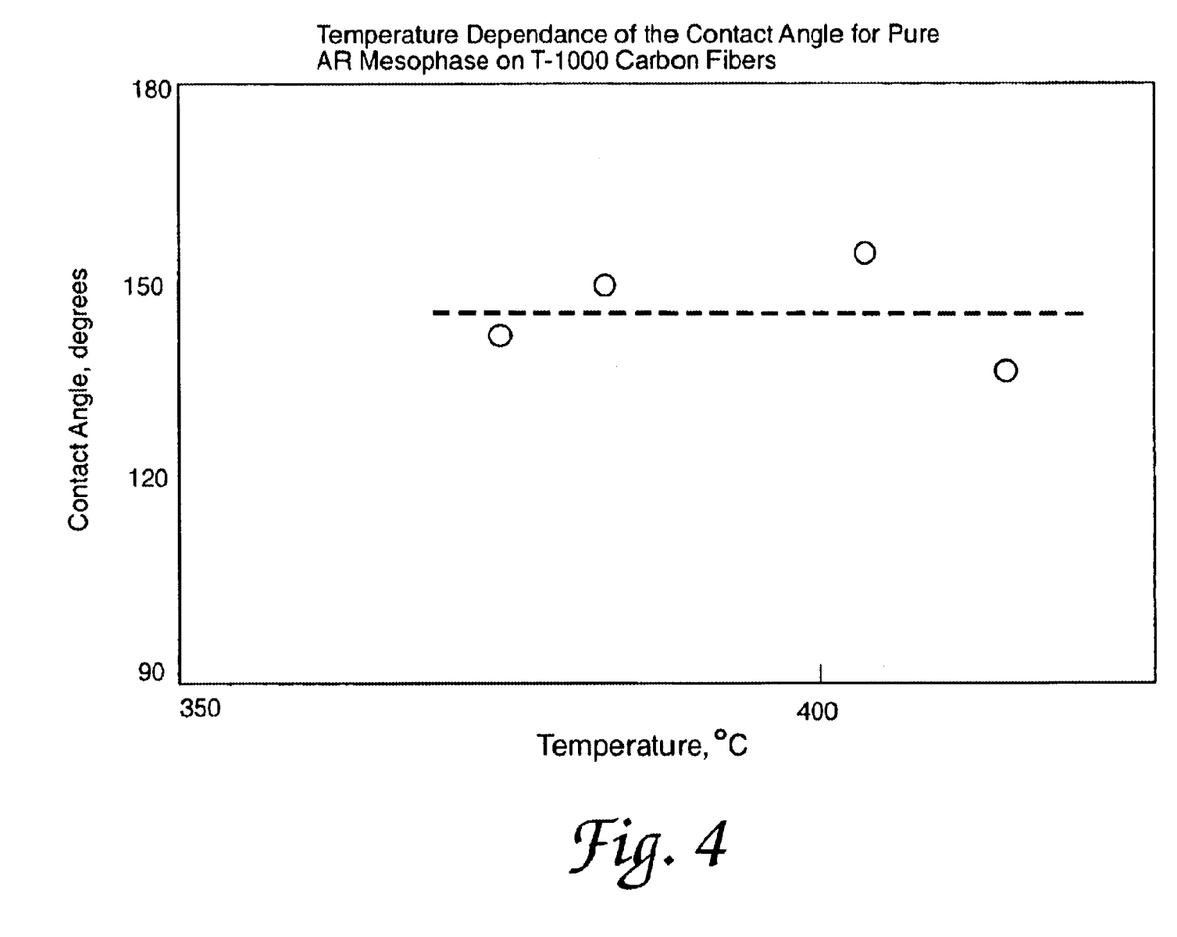
FIG. 4 illustrates the temperature dependence of the viscosity and contact angle for AR Mesophase® pitch on the T-1000 carbon fiber surface.

In addition, it is known from work in our laboratory that during fabrication of C—C composites, for example, high-molecular-weight liquid matrix precursors do not wet fiber surfaces, whereas some low-viscosity low-molecular-weight liquid matrix-precursors at least partially wet fiber surfaces. FIGS. 1–4 present some data for various carbon fiber/carbon matrix precursor pairs. Shown on the left ordinate of each plot is the contact angle of the molten droplet on the fiber surface. (It should be noted that wetting occurs at contact angles less than 90° and spreading occurs at a contact angle of zero degrees.) On the right ordinate is the viscosity of the molten droplet. Both these parameters are plotted as a function of temperature for a number of both pitch- and PAN-based carbon fiber surfaces. For Aerocarb 80® Pitch material, which has an 80% carbon yield, (FIG. 1) it can be seen that it does not wet (contact angle>90°) the surfaces of any of the carbon fibers (T-1000, P-55, and P-100) even though the viscosity is near zero at 400° C. For Aerocarb 70® Pitch material, which has a 70% carbon yield, it can be seen (FIG. 2) that even though the viscosity goes to near zero at 325° C., it does not wet P-55 fiber until 360° C. and it never wets P-1000 fiber. For Aerocarb 60® Pitch material, which has a 60% carbon yield, it can be seen (FIG. 3) that above 250° C. the pitch will wet (contact angle<90°) all the fiber surfaces. In contrast, it can be seen from FIG. 4 that Pure AR Mesophase®, which is currently the pitch material of choice, does not wet (contact angle>90°) a T-1000 carbon fiber surface at any temperature studied.

In fact, as seen in these plots in FIGS. 1–4, in general our work has shown that, for a particular series of pitches, the lower the molecular weight, the better liquid matrix precursors wet fiber surfaces, as measured by contact angle. However, it should be stated that low molecular weight and low viscosity do not guarantee wetting of the matrix material on a particular surface. Whenever liquid matrix-precursors possess good wetting properties impregnation is greatly aided because the precursors readily soak into rigid-preforms in much the same fashion as water soaks into cotton fabric.

In contrast, if the matrix precursor does not wet the fibers as in current processing technology and the patent literature discussed below, pressure will be needed to force the matrix precursor into the preform. This will produce an uneven distribution of matrix precursor in the preform. The result being a higher density near the surface than the center of the preform as well as the closure of surface pores. To try to compensate for these two shortcomings, i.e., inability to densify the billet uniformly and the associated surface pore closures, manufacturers of carbon matrix composites, for example, machine the outside of the billet to open up the pore structure and then re-impregnate, carbonize, graphitize and machine up to eight times. This is an extremely time consuming, labor intensive and costly process that can take up to eight months for a large billet.

The commercial manufacture of carbon-carbon composites has taken place for more than 30 years and is a rather mature field. Both chemical vapor infiltration (CVI) and liquid phase impregnation techniques (or a combination of the two) have been used to place the carbon matrix in the rigidized preform.

During this time the goal has remained the same: to be able to produce a thick (>2") billet with uniform density at low cost. This objective has not been obtained to date commercially due principally to the matrix precursor employed. Conventional gas phase chemical vapor infiltration processes using hydrocarbon precursors are not able to uniformly densify a large-thick billet of complex shape because of the preferential deposition on the outer portion of the billet and the inability to control concentration and temperature gradients in the gas phase. In addition, this family of processes is very expensive due to the expensive equipment and the long processing times required. Attempts to solve the surface deposition problem have involved using a pressure gradient alone or in conjunction with a temperature gradient (hotter on side opposite gas entry) through the part to be densified. In addition, a temperature gradient through the part utilizing a heater in the center in conjunction with surface cooling involving a liquids latent heat of vaporization has been employed. All three approaches have met with some success. However, these techniques are still very costly and limited to relatively small and thin parts with little shape complexity. However, it should be mentioned that the combination of forced flow and a reversed temperature gradient has increased the thickness that can be densified with reasonable uniformity to nearly two inches.

Liquid-phase matrix precursors have included neat organic resins, particulate loaded resins, as well as all types of petroleum and coal tar pitch materials. The patent literature contains many processes that utilize various organic resins, coal tar and petroleum pitch solvent-refined pitches, particulate loaded resins, and super-critically-refined pitches.

The ability to produce low cost composites with uniform density using liquid-phase carbon precursors has been hindered by the conflicting demands of high char yield and low viscosity. Processes using various organic resins as well as coal tar and petroleum pitch suffer from the fact that these materials have low char yield and high viscosity unless solvated. In addition, these materials do not meet the critical criteria of wetting the fiber preform surface. Processes that involve the use of solvent-refined pitches, super-critically-refined pitches and mesophase liquid-crystal polymer have increased the char yield but have not addressed the wettability issue, and thus still require many costly processing cycles to produce a composite that is not uniform in density. The use of carbon particulate loaded resins again increases the char yield. However, these processes suffer from the same problems as non-loaded resins and in addition are not able to densify a thick composite. In fact, they actually produce a lower quality composite because the particles block the pore structure on the first cycle and limit subsequent densification.

Currently, the matrix precursor material of choice is a mesophase liquid crystal polymer made from petroleum pitch using various proprietary temperature-pressure cycles. The use of mesophase pitch brings up one last factor which is pertinent to the understanding of the shortcomings of some existing liquid densification techniques for carbon matrix composites. This is the polymerization pathway used to form the matrix precursor. Since the high-char-yield mesophase pitch, for example, is too viscous to use for impregnation and does not wet the preform surface, the preform is impregnated with low-viscosity, low-char-yield isotropic pitch, which is able to wet the preform surface. This pitch is then converted to mesophase pitch inside the preform using various temperature-pressure cycles. The problem with this technique is that it involves a two-phase addition polymerization process since the mesophase is not miscible in the isotropic pitch from which it is made. Thus, when the size of the mesophase spheres formed in the isotropic pitch within the preform exceeds the size of the space they occupy, they are expelled and replaced with the isotropic pitch material which forms a lower quality matrix.

Instead of using proprietary temperature-pressure cycles to make mesophase pitch, it can be manufactured by the polymerization of naphthalene or other aromatic monomers. There are some patents dealing with polymerization of low-molecular-weight compounds into higher-molecular-weight carbon precursor materials. However, the majority of these patents deal only with the spinning of carbon fibers and do not make any claims regarding use of high-molecular-weight polymers as matrix material. There are a few patents that describe processes for manufacturing C—C's which involve preparation of high-molecular-weight liquid matrix precursors from monomers. It should be stated, however, that all of these patents describe how to impregnate with the liquid matrix-precursor (using, a variety of techniques) while in the form of high-molecular-weight materials only. The formation of high-molecular-weight liquid matrix-precursor takes place in all these patents outside the C—C composite prior to impregnation and attempts to force this high viscosity material into thick fiber preforms to produce a uniform density have not been successful.

One additional example of using mesophase pitch as a precursor needs to be mentioned. The patent of Kawakubo (U.S. Pat. No. 5,096,519) teaches a process for mixing carbon fibers with a low-molecular-weight aromatic hydrocarbon (naphthalene) and a molten salt such as aluminum chloride or potassium chloride as a catalyst to form a mesophase pitch which coats the fibers. Kawakubo describes a technique for coating individual carbon fibers that are pulled from a bath of mesophase pitch and are later used to make a one or two-dimensionally reinforced composite. His process does not require that the naphthalene wet the fibers. Since the mesophase powder formed from naphthalene is already coating the individual fibers, it does not have to be able to flow into the small matrix pockets of a woven or braided preform. Thus, for the application in the Kawakubo patent, any of the high char yield precursors mentioned previously would perform equally well. In addition the Kawakubo patent requires that molding-to-shape of the coated fibers be performed prior to pyrolysis. The molecular weight of the mesophase pitch must therefore be kept relatively low, otherwise fiber breakage will take place seriously degrading composite properties as discussed previously. Certainly, ultra-high molecular weights are not feasible and as a result, it is not possible with the Kawakubo patent to obtain a char yield of 92% from naphthalene. Also, since Kawakubo teaches the coating of the fibers, the molding of the fibers, and the carbonization of the mesophase pitch but not the impregnation of a preform or the reimpregnation of a preform, the product of his patent is a low density composite with low performance.

The historical evolution of carbon matrix precursors from as-received pitch materials to mesophase pitch, has developed to try to improve the quality of the matrix microstructure and to attempt to solve the problem of uniform through-the-thickness density in the finished billet. Over the years the matrix microstructure has been improved but no process to date has been able to uniformly densify a thick preform. This is because the universal criteria for efficient impregnation of the preform has been viscosity. No one has used the more important criteria of wettability in selecting the best matrix precursor. Thus, all the processes in the patent literature rely on temperature to lower the viscosity, and pressure or a combination of vacuum and pressure to force the non-wetting matrix precursor into the rigidized preform. This is a very inefficient process that preferentially fills larger pores, seals off smaller pores, and densifies the exterior of the preform at the expense of the interior. As a result of using a non-wetting matrix precursor or matrix material, many impregnation-carbonization-graphitization-machining-cycles are required to reach a density of 1.9 g/cc. This equals many months of processing at a cost that keeps the market for carbon-carbon small. To add insult to injury, even though the final product is very costly, it does not have uniform density through the billet. It is clear that there is a great need for a low-cost impregnation technology that produces a billet with uniform density and good mechanical properties.

Currently, cost is the main factor that limits the application of carbon-carbon in many areas. Approaches to lower cost have included using low cost fiber, low cost matrix material, adding particulate fillers to the matrix, using random orientation of fibers, as well as molding and hot-pressing techniques. However, in an attempt to lower cost, performance has been degraded to such an extent that it precludes the use of carbon-carbon composites made by these processes in many high-performance structural applications. What is needed is a means to significantly lower the cost of carbon-carbon composites while maintaining or enhancing the composite properties and performance. Since the main cost of carbon-carbon composite fabrication is associated with the densification process, there is a need for a low cost liquid phase densification technique.

Although this invention only addresses liquid phase impregnation, it should be stated that all gas phase infiltration techniques known to date suffer from the same drawbacks as just stated for liquid phase infiltration. That is, they are very time consuming, very costly and are not capable of producing a thick billet with uniform density through the thickness. In fact, CVI processes are even more inefficient than liquid phase processes in densifying the center of a billet. As a result, CVI processing is not normally used to attempt to densify thick preforms. Therefore, there is a more general need. That is, for a densification process that will produce carbon composites at low cost and with uniform density and excellent mechanical properties.

Before discussing ceramic matrix composites, it should be mentioned that there is one additional carbon fiber reinforced composite patent by Witzke et. al. (U.S. Pat. No. 4,970,123) that briefly mentions in-situ polymerization of a monomer to form a matrix around the carbon fibers.

However, it should be clear that the Witzke patent does not address the issues of the present invention. As has been stated previously, this present invention deals with the ability to fabricate thick (at least 4 inches) high-performance, high-temperature fiber-reinforced composites with uniform density. Since the process of Witzke is based on the formation of catalytic fibers of millimeter length within a mold, the thickness of his mold is about 1 mm. Thus, it is clear that this process is not able to fabricate the thick composites of the present invention. His process also does not address the formation of high-temperature composites because his process consists of the formation of a fiber reinforcement in a mold, the placement of a matrix around the fibers, and the curing of the matrix material. Except for the type of fiber reinforcement, the process is identical to that of fiberglass composites. There is no mention of pyrolysis or multiple re-impregnation's that are necessary for HTFRCs. Since there is no mention of pyrolysis, it is highly unlikely that the "polymer" mentioned is able to form a high quality matrix when polymerized. In addition, it is not possible with the Witzke process to produce a high-performance fiber-reinforced composite with the properties needed in each direction. This is because the growth of the filaments is random producing isotropic properties.

Historically, multi-directional continuous fiber-reinforced ceramic matrix composites have suffered from the same problems as carbon-carbon composites. That is, they take a long time to fabricate, have high associated cost, and are incapable of providing a uniform matrix density through the part.

Traditional methods of ceramics manufacture all employ low-molecular-weight raw materials which are then turned into single-piece ("monolithic") ceramics by techniques such as slip casting, hot pressing, and/or sintering. These materials are brittle and are susceptible to catastrophic failure. There are several means to add a reinforcement phase to ceramic materials in order to increase their fracture toughness. These include adding a dispersed phase such as particles platelets, as well as chopped fibers or whiskers to the matrix material with techniques such as casting, molding, extrusion and hot pressing. Two-directional reinforcement in the form of stacked fabric plies can be densified by placing powders, slurries, or a sol-gel between the fabric layers followed by pressing and sintering. However, to achieve maximum performance from a ceramic composite, it is necessary to reinforce a high quality matrix with at least a three-dimensional continuous fiber network. As in the case of carbon-carbon composites, incorporating a continuous multi-dimensional fiber network into ceramics to strengthen and toughen them is very difficult with traditional methods because of fiber breakage. In addition with the use of ceramic fibers, there is the additional problem of the degradation of fiber properties with the temperature (1500°–2400° C.) needed to sinter ceramic particles.

Of all the ceramic forming techniques just mentioned, only sol-gel can be used to densify a multi-dimensional reinforcement. However, this technique is not used because of the low yield per cycle, the necessity of water removal, and the fact that it is currently limited to oxide ceramics. Techniques that can be used to place a ceramic matrix into a complex multi-directional high-performance continuous fiber network without breaking the fibers are chemical vapor infiltration, oxidation of a molten metal ceramic precursor, crystallization of a molten glass precursor and the use of pre-ceramic polymers, which are high-molecular-weight organic and inorganic polymers which turn into ceramics when pyrolyzed. There are numerous types of pre-ceramic polymers that are able to produce a matrix of SiC, SiC—AlN and U.S. Pat. No. 5,516,734), and $SiC/Si_3N_4$ By far, the pre-ceramic polymer most frequently employed is polycarbosilane, which turns into silicon carbide as a result of pyrolysis. It should be noted that none of these referenced patents on pre-ceramic polymers teach the formation of a matrix for a fiber-reinforced composite using these polymers, but rather the synthesis of these materials and the use of these polymers as precursors to form ceramic powders, fibers and coatings. These patents are included as reference to demonstrate the broad range of matrix precursors currently available.

Although chemical vapor infiltration (CVI) is used to make fiber-reinforced ceramic matrix composites, it is not a desirable technique because it is costly, produces non-uniform matrix properties, and tends to produce a brittle matrix. The formation of fiber-reinforced ceramic matrices employing the oxidation of molten metal precursors on the other hand is limited to oxide matrices and by the diffusion of oxygen into the preform. Finally, the use of molten glass precursors to form crystalline ceramic matrices in fiber-reinforced composites is limited to ceramic precursors that form glasses with sufficiently low viscosity.

The manufacture of FR/CMC'S using pre-ceramic polymers (U.S. Pat. Nos. 4,837,230; 5,350,545; 5,336,522; 5,318,930, 5,494,867) has the potential for producing a greater variety of matrix materials than other methods used to densify fiber-reinforced ceramic matrix composites. For this reason as well as the ease of fabrication and the associated low capital investment, pre-ceramic polymers are becoming the route of choice in manufacturing ceramic matrix composites. It is important, however, to recognize that utilizing pre-ceramic polymers as the high-molecular-weight liquid matrix-precursor during conventional FR/CMC fabrication suffers from the same problems as those for high-molecular-weight carbon matrix precursors.

As has been previously stated, in most HTFRC preforms the void space (missing matrix) is so finely dispersed throughout the preform, or reinforcing fibers are so prone to breakage, that conventional impregnation techniques are inefficient. This is the reason that low-viscosity liquid-matrix-precursors have been employed in order to impregnate the finely dispersed voids and/or to avoid fiber breakage. As mentioned previously, because of the polymeric nature of these liquid matrix precursors, low viscosity can be achieved in the unadulterated state (i.e.; no solvents present) only by having the molecular weight low. This, in turn, reduces pyrolysis efficiency and affects matrix quality negatively, as explained earlier. Adding solvents to high-molecular-weight liquid matrix-precursors can certainly aid impregnation and result in improved matrix quality. But this approach actually increases the number of impregnation-plus-pyrolysis steps needed due to the high dilution ratios required to get acceptably low viscosities. Solvent rather than actual liquid matrix-precursor fills up most of the void space within preforms, and it must be removed prior to pyrolysis. This is a very time-consuming process. If solvent is not completely removed, any residual amount will turn into gas at temperatures far below those needed for pyrolysis. These results in either destruction of the preform (it literally explodes) or the expelling of high molecular-weight liquid matrix-precursor impregnated with the solvent.

Manufacturers of ceramic HTFRC's have therefore been faced with two choices. They can employ a low-viscosity liquid matrix-precursor and obtain good impregnation under pressure, filling most larger pores completely, but resulting in a small amount of low-quality matrix due to low molecular weight and poor pyrolysis efficiency. Alternatively they can utilize a high-viscosity liquid matrix-precursor forced in with higher pressure which results in a small amount of better-quality matrix, due to very inadequate pore impregnation, but higher molecular weight and good pyrolysis efficiency. As high performance applications have constantly pressured manufacturers of HTFRC's to increase their products' performance, they have been forced to fabricate composites with higher matrix densities and improved properties, both being critical to composite performance. The result has been a dramatic increase in manufacturing costs because only one avenue exists employing existing technology for HTFRC manufacturers to meet these performance goals. That is to increase the number of impregnation-plus-pyrolysis steps employed using high-molecular-weight liquid matrix-precursors coupled with pressure impregnations. It is not unheard of for fabrications times to take as long as 6 to 8 months because 18 or more impregnation-plus-pyrolysis steps are needed to obtain the required matrix density and quality.

The unique feature of the invention presented herein is that it capitalizes upon the positive aspects of both high-viscosity and low-viscosity liquid matrix-precursors while adding the critical parameter of wettability. Monomers, being by definition the basic building blocks of polymers, are low-molecular-weight compared to polymers. Their viscosities are likewise very low, and are able to easily impregnate pores in low-matrix density composite preforms if they wet the surface. That is, if the monomers do not wet the surface of the preform, pressure will be needed to force the low-viscosity material into the preform. Conversely, if the low-viscosity monomer completely wets the surface, no pressure will be needed for the monomer to be sucked into the preform much like water soaking into a sponge and thereby completely filling it. It is the use of a monomer that wets the preform and the partially-densified preform surface that is one of the main distinctive points of this invention. Once the monomer has been sucked inside the preform, another feature central to this invention is the initiation of polymerization of the monomer molecules, which we refer to as "In-Situ Polymerization of Wetting Monomers". After polymerization takes place, the resulting liquid matrix-precursor will acquire the high molecular weight, needed to produce a superior matrix (upon pyrolysis) with high efficiency. The molecular weight of the polymer can also be controlled in this invention in order to tailor composite properties. Thus, this invention combines the low viscosity of the monomer and the high char yield of the polymer along with the wettability of the monomer to produce a high quality uniform matrix without the need for costly pressure vessels and long processing times with associated high costs.

SUMMARY OF THE INVENTION

With current technology it is impossible to uniformly densify a preform with at least three dimensions of reinforcement and a thickness greater than 2 inches. In addition, it is also not possible to fill the smallest voids in the preform with matrix. As a result, they become closed off during processing which reduces the ultimate density of the composite that can be achieved. Finally, because of the inefficiencies of the currently available techniques, the resulting composites require an inordinate amount of time and expense to produce a high-performance high-density (80% of theoretical) composite. For example, a high-density carbon matrix composite has a density greater than 1.8 g/cc.

This invention describes new types of high-performance high-temperature fiber-reinforced composites as well as a rapid low-cost process to fabricate them. These composites consist of a high volume fraction of high-performance carbon or ceramic reinforcement fibers that can have any number of dimensions (1-D, 2-D, 3-D, . . . n-D) of orientation that it is possible to construct by weaving, braiding, lay-up, etc. In general, what constitutes a high-fiber-volume-fraction depends on the number dimensions of fiber reinforcement but an average value for a high performance composite is 45%. The high quality matrix can be composed of carbon or a variety of ceramic materials either alone or in combination. These composite materials are unique in that they have a uniform density through the composite and the smallest voids are completely filled preferentially by capillary action and remain filled during processing. This means that in one densification cycle the voids within the fiber bundles or tows are completely filled with matrix tightly bonded to the fibers allowing highly efficient transfer of load between the fibers. The result of this complete fiber bundle filling is that after one densification cycle, even though the matrix pockets have not been completely filled, these composites can have the properties of multi-cycle heat-treated (graphitized or sintered) composites of similar density. Thus, in the case of carbon-carbon composites, for example, it is not required (although this is optional) to go through the costly and time-consuming graphitization process in order to achieve desired properties.

In addition, the composites of this present invention are able to have a higher ultimate density than is obtainable by current processes. That is, since in contrast to other processes, the process of the present invention does not close off the smaller pores but completely fills them, and likewise does not close off surface pores, the composite formed by the present process will not contain closed porosity and therefore can be densified to a higher density. Not only can these composites be densified to a higher ultimate density, but they can be densified to the same density as with current techniques but in a fraction of the time and at a fraction of the cost.

The present invention also describes a low cost process for manufacturing high-performance HTFRC's, such as, carbon-carbon and ceramic matrix composites in the form of near-net shaped structures as well as bulk materials, by impregnating composite preforms with low-viscosity liquids which wet the fibers, subsequently undergo polymerization reactions in the preform, and ultimately create ceramic and/or carbon matrices. These preforms include, but are not solely limited to: rigid-preforms; binderless preforms; quasi-sintered preforms which are in need of additional matrix material(s) due to insufficient composite strength or unacceptably high porosity; or they lack a consolidating matrix entirely (binderless preforms). The low-viscosity liquids are low-viscosity liquid-matrix-precursors having low molecular weight. In addition, for the present invention these liquids must wet the surfaces of the preforms that they densify.

Monomers, being by definition the basic building blocks of polymers, are low-molecular-weight compared to polymers. Their viscosities are likewise very low, so they easily (without pressure) impregnate pores in low-matrix-density composite preforms if they wet the surface. Once inside the preforms, monomer polymerization is initiated resulting in a liquid matrix-precursor of the high molecular weight needed to produce a superior matrix (upon pyrolysis) with high efficiency. In contrast to some present processes, such as those using isotropic petroleum pitch, with the in-situ polymerization of the present invention there is only a single phase present within the preform. That is, after the low-molecular-weight wetting monomer coats the preform and fills the voids, it is polymerized into a miscible high-molecular-weight polymer. Although, this high-molecular-weight condensation polymer does not wet the surface, it is not expelled if there is a single phase because it is highly viscous.

With In-Situ Polymerization of Wetting Monomers one can use more than one monomer to densify the preform. These monomers can be impregnated together during the same cycle in order to ultimately form a hybrid matrix material or they can be impregnated during different cycles to form a layered structure for additional fracture toughness. With this technique one can also tailor the molecular weight and make the molecular weight extraordinarily high if this is desired. The reason for doing this is twofold. First, higher molecular weight means fewer polymer chain ends, and therefore higher pyrolysis efficiency. Second, as polymerization proceeds to very high levels, cross-linking often occurs preventing the polymer from flowing. This keeps the matrix in place in the preform without the need of a cross-linking agent. It should be noted that for ceramic matrix composites cross-linking is desirable while for carbon matrix composites it is detrimental and should be avoided to produce a high quality matrix.

In contrast to a good ceramic matrix material, which has little structure and only short range order, a high quality graphite matrix has a long-range 3-D-ordered planar layered structure. Thus, for ceramic matrices using linear monomers, cross-linking is desirable because it maximizes the amount of precursor that stays in the preform without adversely affecting the quality of the resulting matrices. (In some cases it might even improve the quality.) This, of course, maximizes the amount of additional ceramic matrix per densification cycle with a particular monomer. However, for carbon matrices, cross-linking must be avoided. That is, in order to form a high quality graphitic matrix, it is necessary to be able to align and orient the basal planes of the planar molecules in a 3-D long-range-ordered structure. This is only possible if there is no cross-linking between polymer units so that they are free to move and align themselves together.

This concept is easily illustrated by the two most popular carbon fibers on the market today. Pitch-based fibers are not cross-linked and so the graphitic planes are able to align producing a very high strength and very high modulus fiber. Polyacrylonitrile (PAN)-based fibers, on the other hand, are cross-linked during processing. It is not possible to align the graphitic planes of these fibers resulting in much lower thermal conductivity and moduli than pitch-based fibers. Thus, because there are adverse effects from cross-linking in carbon-carbon composites, references to beneficial effects of cross-linking below refer only to ceramic matrices.

The initiation technique for polymerization employed can be any of those typically employed to start and sustain single-phase polymerization. This includes, but is not solely limited to, changing temperature and/or pressure; adding catalysts or reaction initiators to the monomer prior to and or after impregnation of the preform; depositing catalysts or reaction initiators within the preform prior to monomer impregnation; and exposing the preform after impregnation to any of the forms of radiation, energetic atomic particle beams, or electromagnetic fields which initiate and sustain polymerization. It should be noted that any combination of these techniques, or possibly others, can be employed. The purpose is to initiate and sustain single-phase polymerization. Another central feature of this invention is the flexibility it affords the manufacturer of HTFRC's with respect to the degree of polymerization allowable. When polymers are prepared for specific end purposes, such as fiber spinning, extrusion, or impregnation of composites, specific average molecular weights and even specific distributions of molecular weight (describes how molecular weights vary around the average) have invariably been found to be necessary for the processing to function smoothly and efficiently. The molecular weight has certainly been shown to be very important during both impregnation and pyrolysis of HTFRC's, as was discussed in detail earlier. However, with In-Situ Polymerization of Wetting Monomers there is no longer a need to control molecular weight for processing. With the current process, molecular weight need only be varied to enhance specific properties in the final product. Thus, if one desires to make the molecular weight extraordinarily high, one can. The reason for doing this is twofold as stated above. First, higher molecular weight means fewer polymer chain ends, and therefore higher pyrolysis efficiency. Second, as polymerization proceeds to very high levels, cross-linking often occurs preventing the polymer from flowing. Cross-linking, which is beneficial for ceramic matrices but not carbon matrices, consists of repeat-unit bridges joining together otherwise distinct linear chains of polymer. This is usually referred to as "gel formation" and invariably is avoided in conventional processing whenever possible because of its negative effects on polymer processing. For In-Situ Polymerization, however, its occurrence may not be negative but very positive in ceramic systems. As long as cross-linking does not decrease pyrolysis efficiency, immobility prevents any loss of polymeric liquid matrix-precursor during pyrolysis. This loss normally happens to some degree with low-molecular-weight liquid matrix-precursors. Even if cross-linking does not occur, the very high molecular weights obtainable with In-Situ Polymerization greatly minimize polymer loss-by-flow during pyrolysis. If sufficient cross-linking of pre-ceramic polymers does not occur, a cross-linking agent can be used to enhance cross-linking and render the polymer infusible.

After the polymerization reaction has been carried to the desired extent, the pre-carbon or pre-ceramic polymer is converted to the desired matrix material. This is usually accomplished by pyrolysis where heat is used to break the non-matrix atoms such as hydrogen, oxygen and nitrogen off the carbon or ceramic polymer backbone. If additional densification is desired after the matrix is formed, the process of impregnation, polymerization, and conversion is repeated until the desired density is reached.

Once the desired matrix material is formed, there is the option of post-treatment of the composite. This consists of heating the composite to graphitize the carbon or sinter the ceramic matrix to produce a composite with enhanced properties. These post-treatment processes can be performed after each densification cycle is performed or preferably only after the desired densification is reached. However, it should be stated as will be described below, that the graphitization of carbon matrices made by this process is not required as in current processes in order to obtain high-quality high-performance. This results in a very large cost savings over present processes.

Another distinguishing feature of this invention is the identification of the need for the low-molecular weight, low-viscosity monomer to wet the surface so that all porosity (especially the smallest pores) can ultimately be filled producing a composite with uniform density and excellent mechanical properties. It is also important that a single-phase polymerization process be employed.

Therefore, it is an object of the present invention to provide a high-temperature fiber-reinforced composite with essentially uniform density and an insignificant amount of closed porosity.

Another object of this invention is to provide a high-temperature fiber-reinforced composite with excellent properties at low cost in a minimum amount of time.

Another object of the present invention is to produce a carbon-carbon composite with high density, high strength, high modulus and high thermal conductivity without graphitization.

Another object of the present invention is to provide a process of fabrication and/or densification of fiber-reinforced carbon and/or ceramic matrix composites utilizing, in-situ polymerization whereby low-molecular weight liquid matrix-precursors in the form of low viscosity monomers of pre-carbon and pre-ceramic polymers that preferentially wet the preform and partially-densified composite surface are used.

Another object of the present invention is to provide a process for the densification of high-temperature fiber-reinforced composites that is single-phase, rapid, and much lower in cost than current processes Another object of the present invention is to provide a process for the densification of high-temperature fiber-reinforced composites in which the smallest porosity is preferentially filled.

Another object of the present invention is to provide a process to uniformly densify a carbon or ceramic fiber preform regardless of number of fiber reinforcement directions and preform thickness.

Another object of the present invention is to provide a rapid low-cost process for liquid densification of rigid-preforms, binderless preforms, quasi-sintered preforms and any other preforms comprised of reinforcing fibers which require the addition of added matrix materials.

Another object of the present invention is to provide a process wherein cross-linking monomers are added to the primary pre-ceramic monomers in the process to decrease the flow properties of the polymerized primary ceramic monomers.

Another object of the present invention is to provide a process wherein the pyrolysis step is omitted in the final cycle in the in-situ process as noted above.

These and many other objects and advantages of the present invention will be readily apparent to one skilled in the pertinent art from the following detailed description of a preferred embodiment of the invention and the related drawings.

DESCRIPTION OF THE PREFERRED EMBODIMENT

This invention describes unique HTFRC's in which the high quality matrix has essentially uniform matrix density throughout and a higher ultimate density than is possible with current processing techniques. This invention also describes a rapid low-cost technique for manufacturing these unique HTFRC's, in the form of near-net-shaped structures as well as bulk materials. The key to the process is the impregnation of composite preforms with a low-viscosity liquid(s) which preferentially wets both the fiber preform and the partially-densified preform, subsequently undergoes single-phase polymerization reactions in the preform, and ultimately is pyrolyzed creating ceramic and/or carbon matrices. This process is hereafter referred to as "In-Situ Polymerization of Wetting Monomers," and can be employed with a wide variety of preforms and matrix materials.

The first step in the process is to select the fiber-matrix combination to be used in the manufacture of the composite. The choice of the fiber(s) is made on the basis of the desired mechanical properties and other criteria such as its behavior in the use environment. In the case of a ceramic fiber, it may already have a thin coating of a compliant layer of carbon for example, that has a greater elongation to break than the matrix material. This layer, which inhibits crack propagation and increases flexural strength, may be placed by a CVD process (U.S. Pat. No. 4,752,503), for example. Ceramic fibers may also have a barrier coating to keep them from reacting with certain matrix materials.

The monomer(s) of the matrix precursor material is then chosen on the basis of the desired matrix material, the char yield of the matrix precursor, as well as on its ability to wet the nascent or coated fiber surface as well as the surface of the carbon or ceramic matrix material that is made from the pryolysis of the matrix precursor formed by the polymerization of the monomer. The minimum wetting criteria for the matrix monomer is that it forms a contact angle of less than 90° with the surface of the fiber or partially-densified preform so that it wets the surface. It is better that the monomer of the matrix precursor forms a contact angle of less than 10° degrees. However, the preferred situation is that the contact angle is zero degrees with the fiber or partially-densified preform surface so that it easily spreads over the surface. If the fiber surface of choice is not wet by a particular monomer, it may be possible to increase wettability. This can be accomplished by removing the fiber surface sizing as well as by performing a surface treatment to increase surface defects or add chemical functional groups in order to increase the surface energy of an uncoated fiber surface. These treatments include chemical processes such as oxidation, physical processes such as bombardment, or plasma processes. Another option is to apply a coating of another material on the fiber surface to increase wettability. These coatings can include the rigidization cement, an oxidation protection coating on carbon fibers, a compliant layer on ceramic fibers, or a refractory interfacial barrier material in the case of ceramic matrix composites. Alternatively, the monomer itself can be physically or chemically modified to decrease its surface energy so that it will better wet the surface. This can be accomplished in a number of ways such as adding a surfactant to the monomer or modifying chemical functional groups on the monomer.

After the fiber/matrix combination is chosen, the next step is to choose the type preform that is to made from the chosen fibers and then densified. These preforms include, but are not solely limited to, preforms which have been consolidated into their low-density preliminary form by a variety of processes such as wet-filament winding or prepeg layup followed by bagging, for shape retention, and pyrolysis (rigid-preforms); preforms which consist only of reinforcing fibers held together by physical constraining forces, such as clamps and/or dry filament winding and/or weaving ("binderless" preforms); and low-density porous sintered ceramics that may or may not contain fiber reinforcing ("quasi-sintered" preforms). The fibers in these preforms can be random in orientation, but preferably, are oriented in a multiple number of preferred directions. The unifying feature of all these composite preforms is that they are in need of additional matrix material(s) due to insufficient composite strength or unacceptably high porosity. Alternatively, these preforms might lack a consolidating matrix all together, which is known as a binderless preform.

The next step is to impregnate the preform with the wetting monomer. Unlike current processes, since the monomer wets the surface there is no need to use vacuum or pressure to force the monomer into the preform although it is possible to employ a vacuum to remove the air in the preform and speed the impregnation process. Likewise, pressure might be used to slightly enhance the rate of impregnation. However, it should be noted that, contrary to current processes in which vacuum and pressure are needed to force the non-wetting matrix material into the interior of the preform, in the present invention, pressure and vacuum are not needed to impregnate the interior of the preform. It is possible, however, they can be employed to slightly increase the rate of impregnation but the decision to employ pressure is an economic decision and not a technical one. That is, since there is a very great increase in processing equipment cost and difficulty using a high pressure vessel, a decision would have to be made whether the additional investment is warranted to decrease processing time slightly.

In the present invention, the impregnation takes place when the preform is brought into contact with the wetting monomer. This can occur by either immersing the preform in the monomer or by contacting a portion of the preform with a quantity of monomer that is greater than that needed to fill the preform completely. Thus, for instance, the preform could be brought into contact with a reservoir of monomer on its top or bottom surface. The monomer would then be drawn into the preform by capillary action displacing the air. Thus, in this example drawing a vacuum on the preform would not increase the rate of impregnation. After, the preform has been completely filled, it is then placed in a quantity of monomer sufficient to completely cover the preform.

In the preferred embodiment, when the monomer is impregnated into the preform it is necessary that a catalyst be present in the preform along with the monomer. This can be accomplished in a number of ways. For example, the fibers in the preform could be coated with catalyst before it is impregnated with monomer. Alternatively, the catalyst could be mixed with the monomer before impregnation. However, it should be noted that the manner in which the monomer and catalyst are brought together is not crucial to this invention. It is only necessary that they both be present in the preform.

Impregnation of the monomer into the preform is followed by polymerization of the monomer by a single-phase reaction mechanism into an infusible polymer. This usually is accomplished in a closed container so that gases arising from polymerization are not vented directly to the atmosphere. In contrast to other processes, although it can be, the container need not be externally pressurized. However, it should be noted that if the polymerization gases are not vented there will be a small pressure buildup in the container. This small pressure buildup can be controlled by the amount of monomer material and may be desirable although is not absolutely necessary. After polymerization has proceeded to the desired extent, the partially-densified preform is heated to elevated temperature to convert the organic polymer to a carbon or ceramic matrix material if the polymer has become infusible. If the pre-ceramic polymer is not sufficiently cross-linked so that it is still able to melt, the polymer may be treated with a cross-linking agent before it is pyrolyzed. During this pyrolysis step, gases will again be given off and therefore a sealed container or a container with a burn-off oven should be used. If desired, this pyrolysis can be accomplished in the same container used for the impregnation and polymerization. Alternatively, a different container can be used. For many applications, after these steps of impregnation-polymerization-conversion have been performed a sufficient number of times to bring the density to the desired value, the process is complete. However, for some applications, post-processing may be desired, This can be in the form of heat-treatment such as graphitization for a carbon matrix and sintering for a ceramic matrix. This post-processing can be performed after each cycle but preferably only after the final densification cycle.

EXAMPLE 1

This example deals with the densification of a high performance 4-dimensionally woven pitch-carbon fiber preform that measured 4"×4"×6". After performing wetting studies on various carbon fiber surfaces, naphthalene was found to spread over both pitch and PAN fibers and was used as the monomer for a carbon matrix. The required amount of naphthalene along with aluminum chloride catalyst was placed in a Parr reactor and heated in the range 190–260° C. to melt the mixture. The fiber preform was then placed in the molten mixture and the reactor was sealed. The temperature was kept at 190–260° C. and the molten mixture was stirred until impregnation was complete in 4 hour. At this time the temperature of the sealed reactor was raised to 300–500° C. and kept at this temperature for 4 hours for the polymerization to occur. There was no applied external pressure. The only pressure in the reactor was that due to the polymerization products, which was variable depending on the amount of excess monomer. After polymerization was complete, the reactor was vented to the atmosphere through a burn-off oven and the sample was heated to a temperature between 700° C. and 1400° C. for the pyrolysis of the polymer to occur yielding a carbon matrix material. The char yield of the polymerized naphthalene was 92%, which is significantly higher than commercial processes.

During the first cycle, which lasted a total of 24 hours, the density of the preform was increased from 1.0 g/cc to 1.4 g/cc. When the billet was sectioned and examined, it was seen that the fiber bundles were preferentially densified and had actually become reinforced rods in the composite. It was also observed that the density throughout the entire billet was uniform in spite of the thickness. After the billet was densified with four cycles of impregnation, pyrolysis, and carbonization, which took a total of 96 hours, the density had increased to 1.81 g/cc. Normal commercial processing takes 6–8 months to reach this bulk density for a high-performance billet of this size. After the billet had been densified to 1.81 g/cc, it was cut and machined into small rocket nozzles without first graphitizing the billet. These rocket nozzles were then fired in solid rocket motors. On the basis of density, the nozzle fired in the solid rocket motor performed equivalently to a 4-D baseline material that had been subjected to 6 cycles of liquid phase impregnation, carbonization, graphitization and machining which took 6 months.

EXAMPLE 2

A second high performance billet of similar dimensions made from 3-dimensionally woven PAN carbon fibers was densified with naphthalene under similar conditions. This billet was cut up and machined into rocket nozzles (FIG. 6) for liquid rocket engines. Several of these nozzles were fired for two minutes in a liquid rocket engine in which the flame temperature was 2325° C., the chamber pressure was 820 psi., and the oxygen/fuel ratio was 2.9. The recession rate was found to be 0.00049 inches/sec. This is 4 times smaller than an equivalent 3-D material that has been densified by conventional processing techniques.

It is thought that this ablation rate which is significantly lower than that of conventionally processed billets is due to the lack of continuous pore networks. That is, in conventional processing, in order to get good mechanical properties the billet is graphitized after each carbonization cycle. The heating to 2400° C. causes a crack network to form between the fiber tows and the matrix pockets. This network closes as the temperature is lowered but re-opens at elevated temperatures. Although it is thought to increase thermal shock resistance, this crack network also allows gas penetration at elevated temperatures. Thus, in a rocket nozzle application the conventionally processed billet will allow gas penetration and reaction in the pore network as the temperature is raised. In contrast, the in situ processed billet will only react on the exterior surface.

The results of these tests demonstrate that carbon-carbon billets densified by In-Situ polymerization of naphthalene, which were densified in 5% of the time required by current processes and at a small fraction of the cost, performed equal to or exceeded the performance of commercial materials.

EXAMPLE 3

As stated above, this present densification process produces the high quality matrix needed for high-performance high-temperature fiber-reinforced composites. In these composites, the fibers are high-performance fibers, which are oriented in specific directions. In addition, there is a high volume fraction of the fibers (volume occupied by fibers/volume of composite) in the preform and finished composite. This high fiber-volume-fraction means that fiber bundles are closer together and thus the matrix pocket-voids (empty space surrounded by fiber bundles) in the fiber preform are smaller than those in a lower-performance composite. Since the present process is based on wettability, the efficiency of densification is proportional to the preform surface area and inversely proportional to void size. Thus, a high-performance preform with a smaller fiber unit cell and thus smaller voids to fill will densify more efficiently than a low performance preform with less fibers/unit volume.

This example deals with the densification of a low-performance preform with a low fiber-volume-fraction and relatively large matrix pocket-voids. In this preform the ratio of the surface area of the fibers surrounding the matrix pocket void to the volume of the matrix pocket void is relatively small. Since this ratio is small and the current process is surface dominated, it will take many cycles to densify a preform with a low fiber-volume-fraction.

To densify this preform more efficiently in a fewer number of cycles, it is desirable to use a particulate or fiber filler along with the wetting monomer to efficiently fill the relative large matrix pocket-voids. This is accomplished by placing the filler in the preform before impregnation or preferably by entraining the filler in the wetting monomer during impregnation. The choice of filler depends on the type of matrix material desired and its intended use. However, it should be noted that it is imperative that the filler be wet by the monomer. For carbon matrix composites the filler will consist of micron-sized particles or chopped fibers that may possess either a carbon or preferably graphitic structure such as graphitized carbon black or catalytic graphite fibers. (If graphitic material does not wet, it can be surface treated.) Alternatively, fibers or particulates that inhibit the oxidation of carbon or graphite can be employed. For ceramic matrix composites, the filler may have the same composition as the final matrix material or a different composition can be employed. For example, one or more fillers of a different composition than the final matrix material may also act to inhibit crack propagation within the matrix pockets. Thus, there would be reinforcement on two different scales.

The filler decreases the void space but unlike current processes, the filler does not block impregnation but actually enhances it if it is wet by the monomer. That is, in current processes in which the matrix precursor does not wet the preform surface, fillers impede impregnation because they makes the average void size smaller. Thus, with fillers it not only takes more pressure to force the non-wetting precursor into the preform voids but the precursor can not fill the smaller voids and thus the efficiency of impregnation is also decreased. In contrast, with the current surface-tension-dominated wetting process, the filler, because it increases surface area and decreases average void size, enhances the efficiency of the densification process.

In this example, catalytic graphite fibers were used in the densification of a low density carbon fiber preform with a bulk density of 0.4 g/cc. These fibers, which were made by a gas phase process using metal catalyst particles and possess a diameter of 2 microns, were ground up so that their lengths were of micron dimensions. The fibers, which are wetted by naphthalene, were mixed with the naphthalene wetting monomer and aluminum chloride catalyst and then entrained in the liquid as it soaked into the preform under capillary forces. The conditions of impregnation, polymerization, and pyrolysis were the same as in previous examples. The filler loading of the monomer increased the uptake on each cycle by 20%.

EXAMPLE 4

As in the previous example a low-density low-performance sample was densified using the techniques of this present invention in order to demonstrate that this process can also be used to densify a low performance preform. In this example the samples was a needled-felt that had a dry density of 0.4–0.5 g/cc. After only one densification cycle, the density increased to >1.0 g/cc with an effective weight gain of up to 119%. After only 4 cycles, which took only 6 days of processing, the true density had increased to 1.8 g/cc. With a high-performance high fiber-volume-fraction preform, pressure has little effect during impregnation in the present process because capillary action of the wetting monomer pulls matrix monomer into the preform and holds it there. However, for a low fiber-volume-fraction preform in which the voids are relatively large, pressure can be an aid in keeping monomer in the center of the voids. Thus, it was found that pressurization with 500 psi argon during impregnation in the first cycle increased the weight gain by 35%. Pressurization with 500 psi Argon during polymerization had a negligible effect on char yield. When the preform voids are significantly filled leaving only small voids, pressure again has little effect.

Although rocket nozzles made by the present process performed exceedingly well, there are final steps in processing as well as additional steps in post-processing of the densified billet that can be taken to improve the performance of nozzles made by the current process. In some applications involving high-temperature erosive environments, such as rocket motors or nose-cones, it may be not be advantageous to follow the final impregnation with monomer and subsequent In-Situ Polymerization with the usual final pyrolysis step. Instead, this final pyrolysis step can be left to take place during actual use, and thereby enhance performance due to both the heat absorption required to pyrolyze the final batch of In-Situ Polymerized matrix-precursor and/or outgassing, (of the small amount of polymer lost as gas during high-efficiency pyrolysis). This is normally referred to as "ablative protection". The monomer employed in this final truncated densification step can, of course, be different than monomer employed in earlier steps. This might be done, for example, if the beneficial effects of outgassing were to be increased. Employing a monomer for the final densification which produces polymer with a low pyrolysis efficiency would achieve this goal. Also, molecular weight of the final In-Situ Polymerized matrix-precursor could be deliberately left low to increase the ablative effect.

It should be noted at this point that additional fabrication processes can be carried out on the In-Situ Polymerized preforms at any time during a given In-Situ Densification cycle; i.e., either before, concurrent with, or after pyrolysis. Examples of such additional fabrication processes are sintering, graphitization, and exposure to high-energy electron, magnetic, or particle beams. These processes would have the effect of modifying physical and/or chemical properties of the composite's matrix, fibers, fiber-matrix interface, or surface. Graphitization, for example, can affect a structural change in any or all of these carbon-carbon composite areas depending on the actual conditions employed.

Clearly many modifications and variations of the present invention are possible in light of the above teachings and it is therefore understood, that within the inventive scope of the inventive concept, that the invention may be practiced otherwise than specifically claimed.

What is claimed is:

1. A high-temperature fiber-reinforced carbon-carbon composite material of essentially uniform density, fabricated by the steps of:
   (a) providing a carbon fiber preform of desired shape and fiber placement;
   (b) providing melted naphthalene;
   (c) impregnating said fiber preform with said naphthalene;
   (d) polymerizing said naphthalene in-situ in a single phase process into a pre-carbon polymer of desired molecular weight;
   (e) pryolyzing said pre-carbon polymer to form a carbon matrix material; and
   (f) repeating steps (c)–(e) to further densify said preform.

2. The product of claim 1 wherein a microscopic filler material is mixed with said melted naphthalene prior to impregnation.

* * * * *